(12) United States Patent
Crouch (10) Patent No.: US 9,933,330 B2
(45) Date of Patent: *Apr. 3, 2018

(54) BOUNDARY LAYER FLOW SENSOR (71) Applicant: The Boeing Company, Chicago, IL (US)

(72) Inventor: Jeffrey D. Crouch, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,754

(22) Filed: Feb. 27, 2017

(65) Prior Publication Data
US 2017/0167947 A1 Jun. 15, 2017

Related U.S. Application Data (63) Continuation of application No. 14/261,594, filed on Apr. 25, 2014, now Pat. No. 9,592,920.

(51) Int. Cl.
| G01M 9/00 | (2006.01) |
| G01M 9/06 | (2006.01) |
| G01P 5/14 | (2006.01) |
| G01P 5/165 | (2006.01) |
| G01P 13/02 | (2006.01) |
| B64D 43/00 | (2006.01) |
| G01K 5/28 | (2006.01) |

(52) U.S. Cl.
CPC ............. G01M 9/065 (2013.01); B64D 43/00 (2013.01); G01K 5/28 (2013.01); G01P 5/14 (2013.01); G01P 5/165 (2013.01); G01P 13/025 (2013.01)

(58) Field of Classification Search
None
See application file for complete search history.

(56) References Cited

U.S. PATENT DOCUMENTS

| 2,488,810 | A | 11/1949 | Easterday |
| 3,273,399 | A | 9/1966 | Saltzman et al. |
| 3,710,814 | A | 1/1973 | Shinn |
| 5,036,711 | A | 8/1991 | Good |
| 8,870,275 | B1 | 10/2014 | Schmidt |
| 2006/0086184 | A1 | 4/2006 | Collot |

(Continued)

FOREIGN PATENT DOCUMENTS

| EP | 0 881 498 | 12/1998 |
| WO | WO 94/014075 | 6/1994 |

OTHER PUBLICATIONS

Canadian Office Action dated Apr. 21, 2016 from CA Application No. 2,879,842.

(Continued)

*Primary Examiner* — Andre Allen
(74) *Attorney, Agent, or Firm* — Miller, Matthias & Hull LLP (57) ABSTRACT

Apparatus and methods described herein provide for boundary layer flow sensor and corresponding determination of the flow characteristics of an ambient airflow over an aerodynamic surface. According to one aspect of the disclosure provided herein, the boundary layer flow sensor includes a body configured for mounting within or below the aerodynamic surface, a pressure port configurable between an open state for taking pressure measurements within the boundary layer of the ambient airflow and a closed state that protects the pressure port from contaminants when not in use.

20 Claims, 9 Drawing Sheets

(56) References Cited

U.S. PATENT DOCUMENTS

2011/0110777 A1    5/2011  Abdallah
2014/0245830 A1    9/2014  Martin

OTHER PUBLICATIONS

Extended European Search Report dated Jul. 21, 2015 from EP Application No. 15157613.9.
Allen, R.M. and E.I. Plunkett, "A Rivet Hole Sensor for Measuring Airplane Fuselage Acoustic Pressures", AAIA/NASA $9^{th}$ Aeroacoustics Conference, Oct. 15-17, 1984, Williamsburg, VA, pp. 1-7.
Head, M.R. and I. Rechenberg, "The Preston Tube as a Means of Measuring Skin Friction", Department of Engineering, University of Cambridge, Mar. 29, 1962, pp. 1-17.
Gadd, G.E., Ph.D., "A Note on the Theory of the Stanton Tube", Ministry of Aviation, Aeronautical Research Council Reports and Memoranda, R&M No. 3147, A.R.C. Technical Report, 1960, 13 pgs.

BOUNDARY LAYER FLOW SENSOR

CROSS-REFERENCE TO RELATED APPLICATIONS

This application is a continuation of co-pending U.S. patent application Ser. No. 14/261,594, filed on Apr. 25, 2014, entitled "Boundary Layer Flow Sensor," which is expressly incorporated by reference in its entirety.

BACKGROUND

Ambient airflow over an aerodynamic surface creates a boundary layer at the surface over which it flows. The airflow at the aerodynamic surface may be thought of as having zero velocity at the precise location abutting the surface due to the viscosity at the surface, speeding up to the mean velocity of the ambient airflow at a distance from the surface. The airflow within this distance defines the boundary layer. The airflow within a boundary layer may be generally characterized as laminar or turbulent. Laminar flow is generally associated with lower skin friction, lower flow velocity near the surface, and thinner boundary layer thickness as compared with turbulent flow. As a result, laminar flow is often desirable in order to reduce aerodynamic drag.

Determining whether an airflow is laminar or turbulent may be done in various ways, each of which is undesirable for various reasons. Conventional techniques include using an infrared camera to measure surface temperature, using a hot film to measure sheer stress, or using a pressure tube mounted on the surface to measure the total pressure of the airflow. These techniques are often cumbersome, not practical for routine flight operations, not useful in all desired locations, and create additional drag while lacking the robustness needed for continued use in actual flight operations.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a boundary layer flow sensor and corresponding method for determining the characteristics of an ambient airflow over an aerodynamic surface. According to one aspect of the disclosure provided herein, a boundary layer flow sensor includes a body and a pressure port. The body is configured for mounting below an aerodynamic surface and has a pressure tube extending along a longitudinal axis of the body. The pressure port is configurable between an open state and a closed state. In the open state, the pressure tube is fluidly coupled to a lower portion of a boundary layer of the ambient airflow over the aerodynamic surface. In the closed state, the pressure tube is decoupled from the boundary layer.

According to another aspect, a boundary layer flow sensor includes a body configured for mounting within a fastener aperture within an aerodynamic surface. The body includes a movable shaft that is moveable between a raised position to create an open state for a pressure port and a lowered position to create a closed state for the pressure port. In the closed state, the body is substantially flush with the aerodynamic surface. The moveable shaft includes a total pressure tube extending along a longitudinal axis of the movable shaft and is substantially aligned with the ambient airflow when the pressure port is in the open state. The moveable shaft also includes at least one static pressure tube positioned at an offset angle from the total pressure tube.

According to yet another aspect, a method for determining flow characteristics of an ambient airflow over an aerodynamic surface includes exposing a pressure port to a lower portion of a boundary layer of the ambient airflow. At least one pressure is measured within the ambient airflow and used to determine whether the ambient airflow is substantially laminar or turbulent.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to apparatus and methods for providing a boundary layer flow sensor and corresponding use for determining the flow characteristics of the ambient airflow over the sensor. Specifically, the boundary layer flow sensor described herein may be used to determine laminar or turbulent flow conditions associated with an aerodynamic surface. As discussed briefly above, it is often useful to determining whether an airflow is laminar or turbulent over a particular aerodynamic surface or at a particular location on the surface. This determination may be useful in testing situations, such as during wind-tunnel or flight testing of a particular aircraft component, or during actual flight operations of an aircraft.

Conventional techniques for determining laminar or turbulent flow include using an infrared camera to measure surface temperature, using a hot film to measure sheer stress, or using a pressure tube mounted on the surface to measure the total pressure of the airflow. With respect to the infrared camera technique, the difference between heat transfer properties of laminar and turbulent airflows, a temperature gradient at the transition location may be seen with an infrared camera. However, this technique is not practical in many situations, such as use during flight operations or to determine the airflow characteristics at a location that is not readily visible.

Hot film may be embedded in a layer on the aerodynamic surface and used to measure sheer stress based on the heat transfer in the location of the film. The fluctuation content associated with that measurement may be used to determine the characteristics of the airflow. However, the hot film is not very durable, requiring special care. As a result, this method for determining the airflow characteristics is not ideally suited for flight operations.

Pressure tubes mounted to an aerodynamic surface provide an accurate measure of the total pressure of the airflow directed into the tubes. This pressure may be used to determine a velocity gradient of the airflow within the boundary layer. Because the velocity gradient at the surface associated with a turbulent boundary layer is characteristically higher than the velocity gradient of the same airflow in a laminar boundary layer, the state of the airflow may be determined as being laminar or turbulent at the location of the pressure tube. A problem with these types of conventional measurements using pressure tubes is that the tubes are mounted externally to the aerodynamic surface, which creates drag and is not practical for flight operations. Additionally, forward facing pressure tubes may get contaminated by foreign objects such as grit, dirt, ice, water, or other particles in the environment and ambient airflow, or induced by the environment due to changes in temperature or pressure.

Utilizing the concepts and technologies described herein, a boundary layer flow sensor may be mounted within an aerodynamic surface and transitioned between open and closed states. In the open state, a pressure port is exposed to a lower portion of the boundary layer of an ambient airflow in order to measure total pressure, as well as static pressure according to some embodiments. In the closed state, the pressure port is decoupled from the ambient airflow such that the sensor is substantially flush with the aerodynamic surface to allow for laminar airflow and to prevent contamination of the pressure port.

Figure 1:
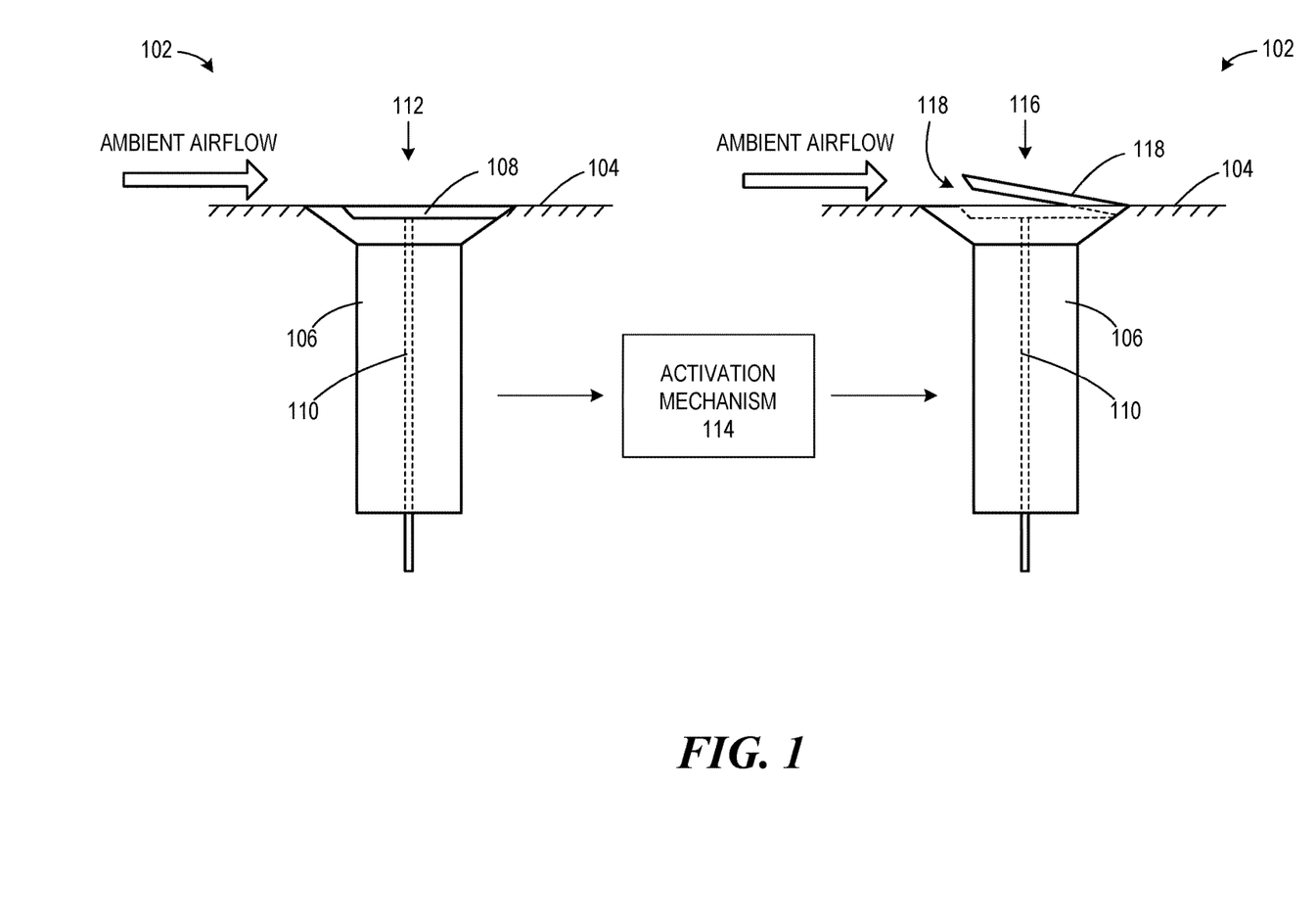
FIG. 1 is a side view of a boundary layer flow sensor in closed and open states, the boundary layer flow sensor having a hinged cover according to one embodiment presented herein.

References are made to the accompanying drawings that form a part hereof, and which are shown by way of illustration, specific embodiments, or examples. Like numerals represent like elements through the several figures. Turning now to FIG. 1, a boundary layer flow sensor 102 is shown according to one embodiment. The boundary layer flow sensor 102 is shown according to two operational states, a closed state 112 and an open state 116. The boundary layer flow sensor 102 may be selectively re-configured between the closed state 112 and the open state 116 via an activation mechanism 114 during flight operations or testing of an aircraft in which the boundary layer flow sensor 102 is mounted. The activation mechanism will be described in detail below with respect to FIG. 8. By providing a closed state 112 and an open state 116, the boundary layer flow sensor 102 may be effectively utilized to measure pressures within the ambient airflow over an aerodynamic surface 104 when desired, while protecting the boundary layer flow sensor 102 from contaminants and preventing disruption of the ambient airflow when not used to acquire pressure measurements.

According to the embodiment shown in FIG. 1, the boundary layer flow sensor 102 includes a body 106 mounted within or below the aerodynamic surface 104. The aerodynamic surface 104 may be an aircraft wing, flight control surface, stabilizer, fuselage or any surface over which an ambient airflow moves and in which it is desirable to determine whether that airflow is laminar or turbulent. The body 106 is mounted in a position such that the boundary layer flow sensor 102 is substantially flush with the aerodynamic surface 104. While this embodiment shows a top surface of the boundary layer flow sensor 102 that is substantially coplanar with the aerodynamic surface 104, other embodiments described herein may include a lid or other component that slightly projects above the aerodynamic surface 104. Accordingly, for the purposes of this disclosure, "substantially flush" may include coplanar arrangements as well as projections above the aerodynamic surface 104. To create a coplanar arrangement, the top surface of the boundary layer flow sensor 102, the body 106, the lid or moveable cover of the boundary layer flow sensor 102, the fastener in which a moveable shaft of the boundary layer flow sensor 102 is positioned, or any combination of these components, may be countersunk within the aerodynamic surface 104.

As will be described in further detail below, the body 106 may be formed from a fastener that is typically used on the aerodynamic surface 104 that has been hollowed to accommodate the components of the boundary layer flow sensor 102. Alternatively, the body 106 may be sized according to a typical fastener so that the boundary layer flow sensor 102 may be mounted within a fastener aperture that already exists in the aerodynamic surface 104. In other embodiments, apertures may be incorporated into any portion of the aerodynamic surface 104 in which it would be desirable to have a boundary layer flow sensor 102 mounted within.

The boundary layer flow sensor 102 of FIG. 1 has a pressure tube 110 extending along a longitudinal axis of the body 106. The pressure tube 110 provides a pathway for the ambient airflow captured at the pressure port 118 to a pressure transducer or to an associated tube leading to pressure transducer, as will be described in greater detail below with respect to FIG. 5B. The pressure port 118 is created when the activation mechanism triggers the boundary layer flow sensor 102 to transition from the closed state 112 to the open state 116. The open state 116 fluidly couples the pressure tube 110 to a lower portion of a boundary layer of an ambient airflow over the aerodynamic surface 104, and the closed state 112 decouples the pressure tube 110 from the boundary layer. For the purposes of this disclosure, the pressure port 118 may be considered the opening that couples the pressure tube 110 to the ambient airflow, allowing the associated air pressure to be measured.

Throughout the various embodiments described herein, the boundary layer flow sensor 102 is re-configurable between the closed state 112 and the open state 116 to selectively protect and expose the pressure port 118. However, various embodiments will be described to provide various mechanisms for providing the closed state 112 and the open state 116, along with corresponding variations in the configuration of the pressure port 118. According to the embodiment shown in FIG. 1, the boundary layer flow sensor 102 includes a body 106 that is fixed within or below the aerodynamic surface 104, and a movable cover 108. The moveable cover 108 in this example includes a hinged cover 118 that pivots from a rear edge, extending the front edge of the hinged cover 118 upwards to create an air scoop, or opening, which couples the pressure tube 110 to the ambient airflow to create the pressure port 118.

Figure 2:
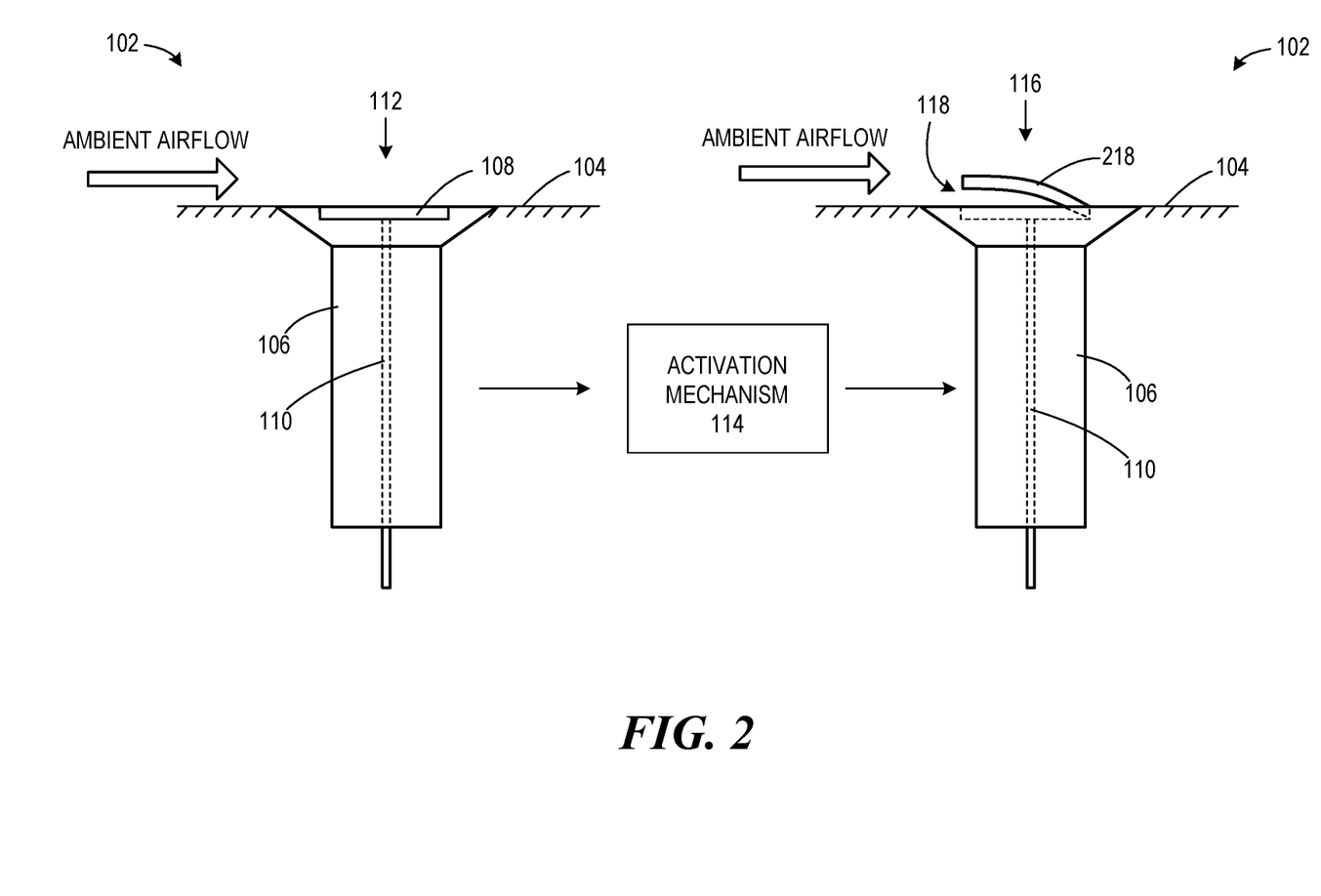
FIG. 2 is a side view of a boundary layer flow sensor in closed and open states, the boundary layer flow sensor having a deformable cover according to one embodiment presented herein.

Turning now to FIG. 2, an alternative embodiment of a boundary layer flow sensor 102 having a moveable cover 108 will be described. According to this embodiment, the boundary layer flow sensor 102 is similar to the sensor described with respect to FIG. 1, including the transition between the closed state 112 and the open state 116 utilizing a moveable cover 108. However, according to this implementation, the moveable cover 108 includes a deformable cover 218. The deformable cover buckles outward or otherwise deforms from a substantially planar configuration represented by the closed state 112 to a curved, bent, or otherwise buckled configuration shown with respect to the open state 116. As will be described in greater detail below, the activation mechanism 114 for providing the transition between the closed state 112 and the open state 116 may include the use of a shape memory allow within the deformable cover 218 that is configure to deform to create the open state 116 according to a threshold temperature, or may include a metal or material manufactured with an internal bias or torque that may be "popped" to the deformed configuration to create the open state 116 utilizing a relatively small mechanical force that may be triggered electrically or via a diaphragm or other pressure or temperature sensitive mechanism.

Figure 3A:
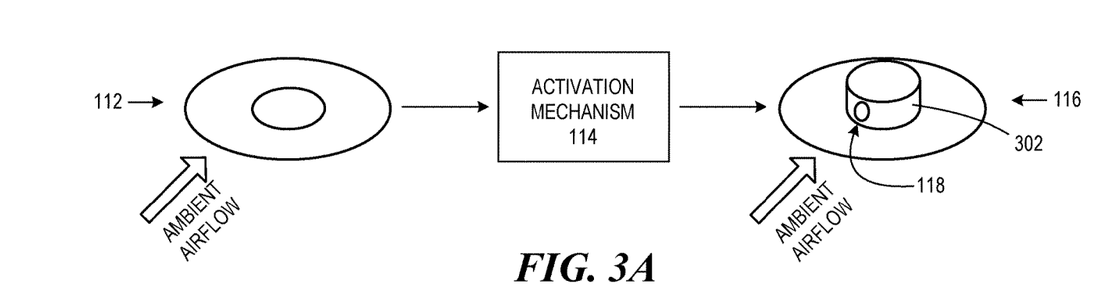
FIGS. 3A and 3B are top perspective and side views, respectively, of a boundary layer flow sensor in closed and open states, the boundary layer flow sensor having a movable shaft according to one embodiment presented herein.
Figure 3B:
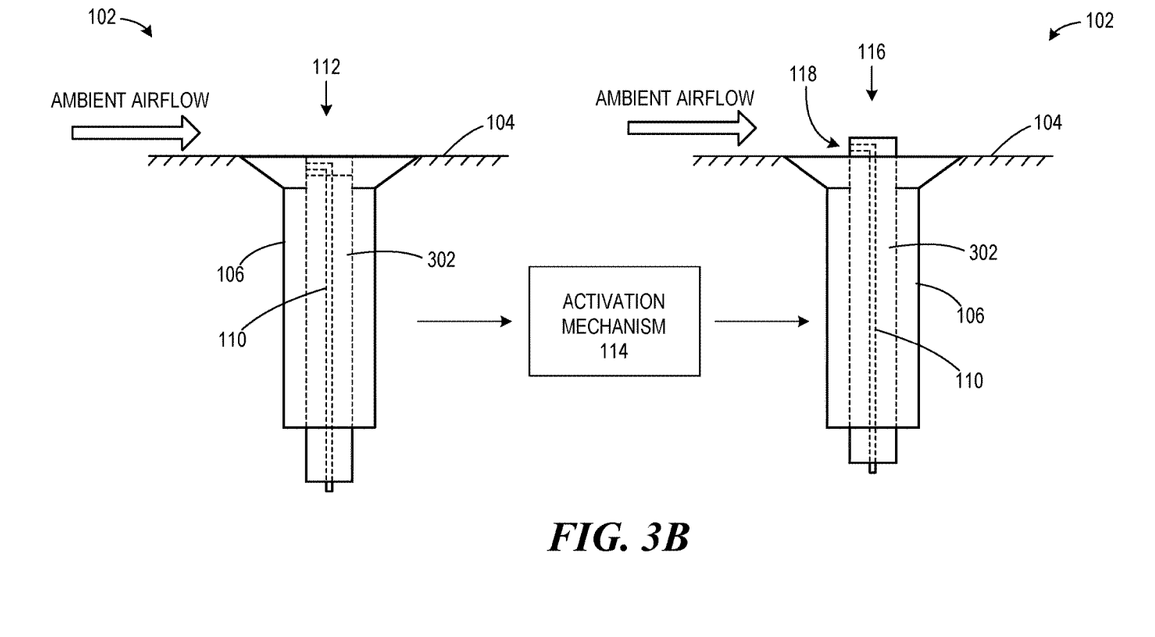

FIGS. 3A and 3B show top perspective and side views, respectively, of a boundary layer flow sensor 102 in a closed state 112 and an open state 116 according to another embodiment. In this embodiment, the boundary layer flow sensor 102 includes a movable shaft 302 positioned within the body 106. The activation mechanism 114 may be responsive to an ambient condition, such as temperature or pressure, or to a control input or predetermined condition or action to transition the boundary layer flow sensor 102 between the closed state 112 and the open state 116. In doing so, the movable shaft 302 is raised from within or below the aerodynamic surface 104 to create the pressure port 118 by exposing the pressure tube 110 to the ambient airflow. It should be appreciated that the body 106 of this embodiment may include a fastener that has been hollowed out or otherwise configured to accept the moveable shaft 302. Consequently, the moveable shaft 302 may be sized according to a particular fastener in which it is to be positioned.

Figure 4A:
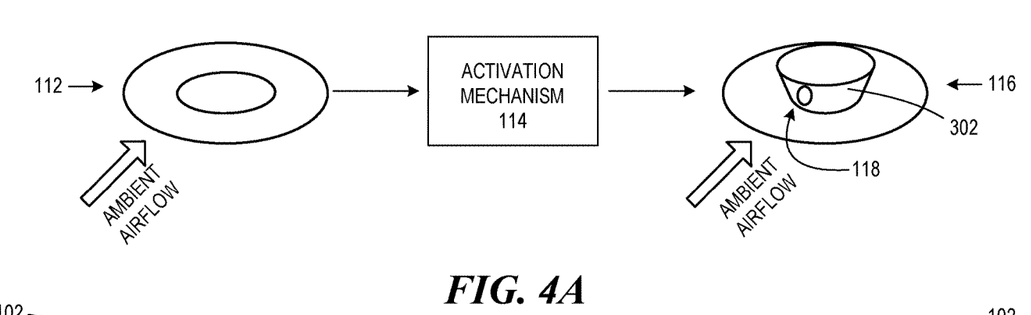
FIGS. 4A and 4B are top perspective and side views, respectively, of a boundary layer flow sensor in closed and open states, the boundary layer flow sensor having a movable shaft according to an alternate embodiment presented herein.
Figure 4B:
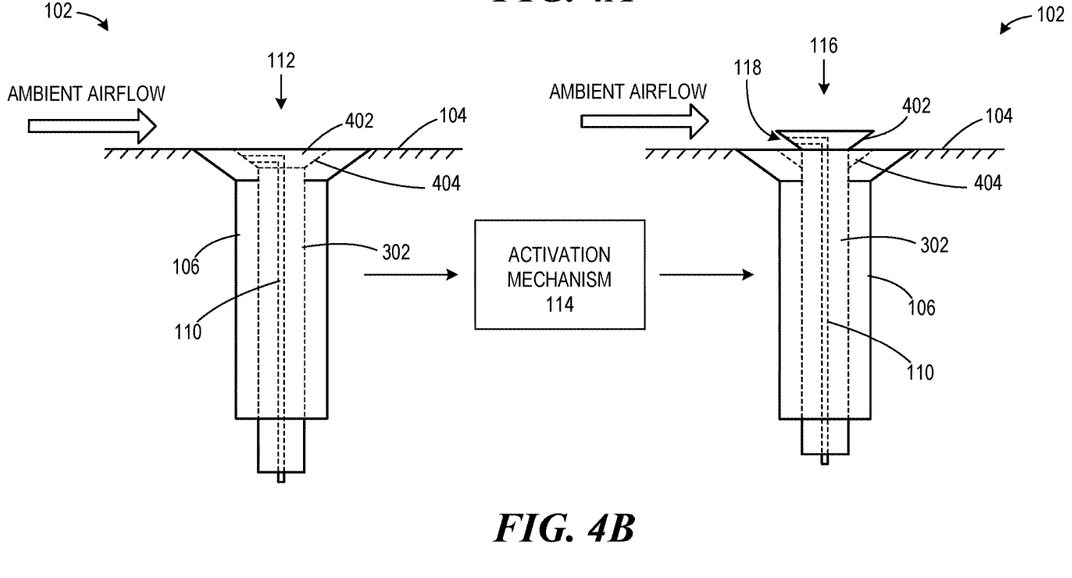

FIGS. 4A and 4B show a similar embodiment in which the top portion 402 of the moveable shaft 302 is substantially conically shaped to compliment and nest within a conically shaped recess 404 of the body 106 when configured in the closed state 112. In doing so, the pressure tube 110 is better sealed when closed, providing better protection.

Figure 5A:
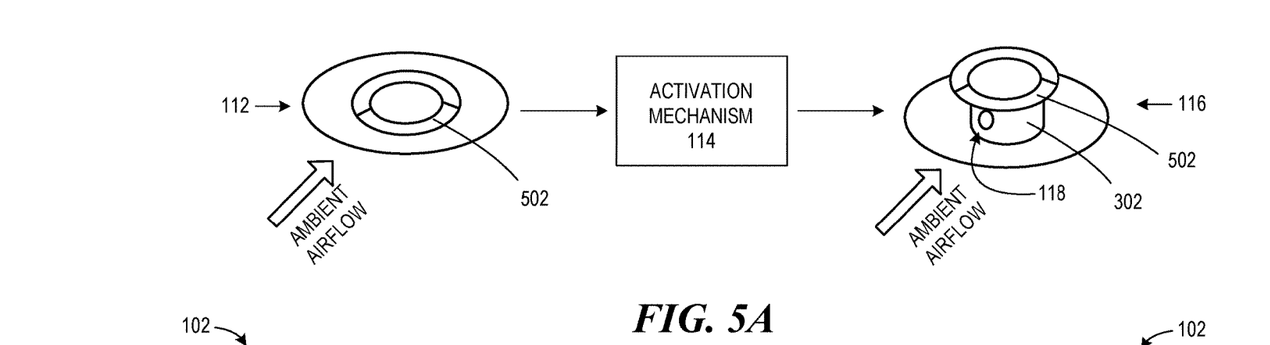
FIGS. 5A and 5B are top perspective and side views, respectively, of a boundary layer flow sensor in closed and open states, the boundary layer flow sensor having a movable shaft with a lid according to one embodiment presented herein.
Figure 5B:
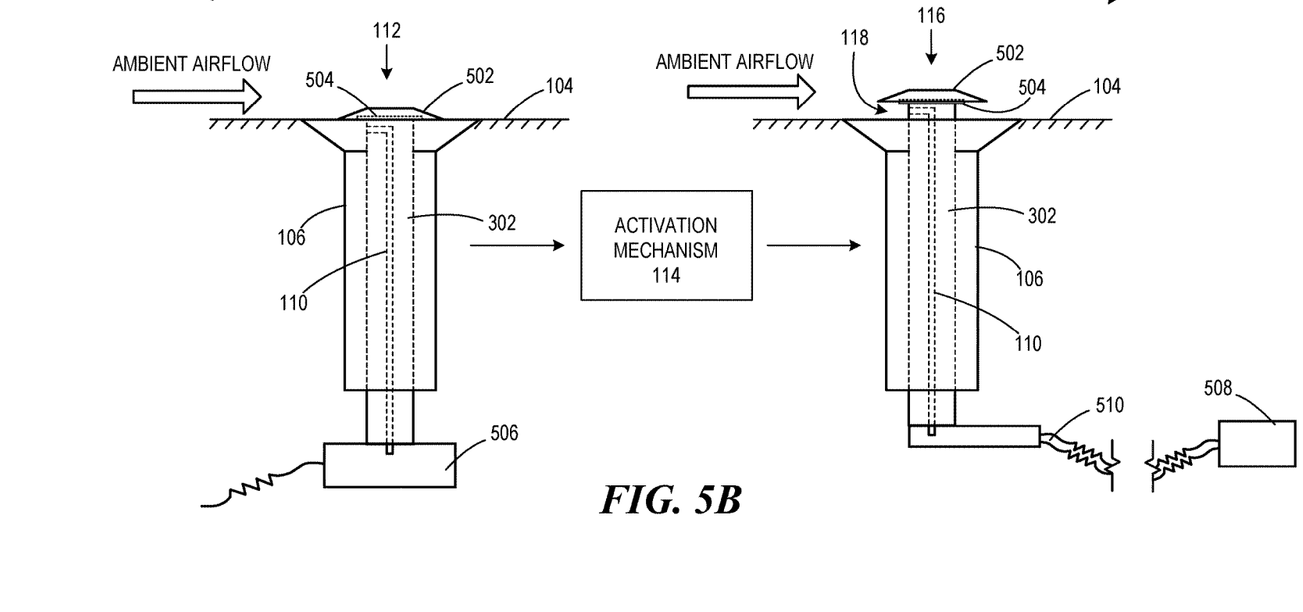

FIGS. 5A and 5B show top perspective and side views, respectively, of an alternative embodiment of a boundary layer flow sensor 102 in a closed state 112 and an open state 116. According to this embodiment, the boundary layer flow sensor 102 has a moveable shaft 302 that raises and lowers to selectively expose or close the pressure port 118. This embodiment is similar to that described above with respect to FIGS. 3A and 3B, however, as seen in FIGS. 5A and 5B, the boundary layer flow sensor 102 of this example includes a lid 502 attached to the movable shaft 302. As shown, when the movable shaft 302 is lowered to the closed state 112, the lid 502 may be substantially flush with the aerodynamic surface 104. The thickness of the lid 502 may be sufficiently thin as to allow for laminar airflow over the lid 502 and the aerodynamic surface 104 without triggering a transition to turbulent airflow. For some implementations, this thickness may be less than 0.01 inches.

An advantage provided by the lid 502 is that it may provide additional protection for the moveable shaft 302 from contamination entering the space around the moveable shaft 302 within the body 106. In particular, one embodiment utilizes an o-ring 504 to provide a watertight seal between the lid 502 and the top surface of the boundary layer flow sensor 102 when configured in the closed state 112. It should be appreciated that while not shown in the figures, an o-ring 504 or other seal may be utilized with any embodiment utilizing a moveable shaft 302. The o-ring 504 may be fitted into the body 106 surrounding the moveable shaft 302. It should also be appreciated that while not shown in the figures, a shallow recess in the body 106 may be utilized to further enhance the seal when closed. This may also assist in providing a sufficiently thin lid for preserving laminar flow.

FIGS. 5A and 5B also illustrate two different embodiments for converting the air pressure within the pressure port 118 to a pressure measurement to be used in the determination of the ambient airflow characteristics. To convert the air pressure to a value, a pressure transducer is conventionally used. FIG. 5A shows a local transducer 506 that is coupled to the pressure tube 110 via a direct connection with the body 106 or moveable shaft 302. FIG. 5B shows an external transducer 508 that is coupled to the pressure tube 110 via a transducer tube 510. The transducer tube 510 is simply a tube that fluidly connects the pressure tube 110 to the external transducer 508 located in a separate location from the boundary layer flow sensor 102. The local transducer 506 may provide a more compact solution as only electrical signals are transported away from the boundary layer flow sensor 102. The external transducer 508 may include a number of transducer tubes 510 from a number of boundary layer flow sensors 102 to feed into one or more multi-channel transducers located at a central location. The disclosure herein is not limited to any particular type of pressure transducer.

Figure 6:
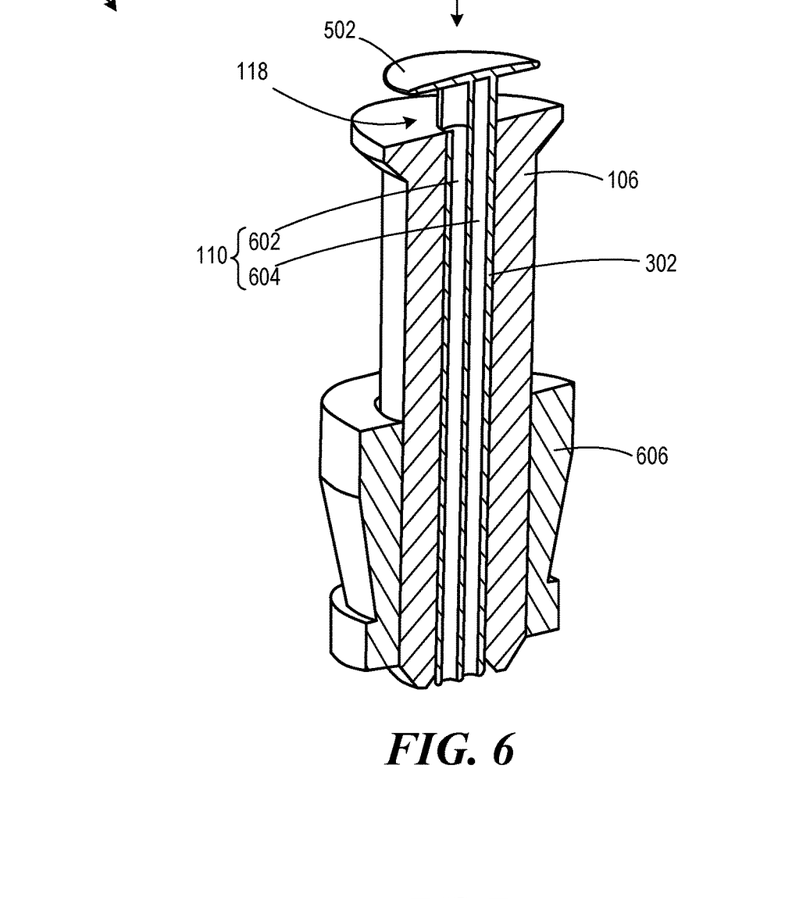
FIG. 6 is cross-sectional view of a boundary layer flow sensor having a movable shaft with a lid, total pressure tube, and static pressure tubes according to one embodiment presented herein.

FIG. 6 shows a cross-sectional view of a boundary layer flow sensor 102 according to one embodiment. As seen in this example, the boundary layer flow sensor 102 includes a moveable shaft 302 with a lid 502. This example illustrates a securing mechanism 606 positioned on the inside of the aircraft wing or other component housing the boundary layer flow sensor 102, on an opposite side of the aerodynamic surface 104, and is used to secure the body 106 in place. The securing mechanism 606 may be threaded and in conjunction with the body 106, may operate like a nut and bolt to hold the boundary layer flow sensor 102 in place within or below the aerodynamic surface. Alternatively, any type of securing mechanism may be used, including but not limited to inducing deformation in the body 106 during installation to hold the body 106 in place (similar to a rivet), tabs on the body 106 that engage the aerodynamic surface 104, or the like.

One aspect of the boundary layer flow sensor 102 shown in FIG. 6 that varies from the embodiments described above is that the boundary layer flow sensor 102 in this example is configured to not only measure the total pressure, but also the static pressure within the lower portion of the boundary layer of the ambient airflow. The pressure tube 110 in the embodiments described above with respect to FIGS. 1-5 is configured to measure total pressure of the ambient airflow within the lower portion of the boundary layer. In this example, there are multiple pressure tubes 110. In particular, the pressure tubes 110 include a total pressure tube 602 configured to measure the total pressure of the ambient airflow within the lower portion of the boundary layer and at least one static pressure tube 604 configured to measure the static pressure within the lower portion of the boundary layer. Like the total pressure tube 602, each static pressure tube 604 is positioned along the longitudinal axis of the body 106 such that when the pressure port 118 is configured in the open state 116, the static pressure tube 604 is fluidly coupled to the lower portion of the boundary layer.

Figure 7:
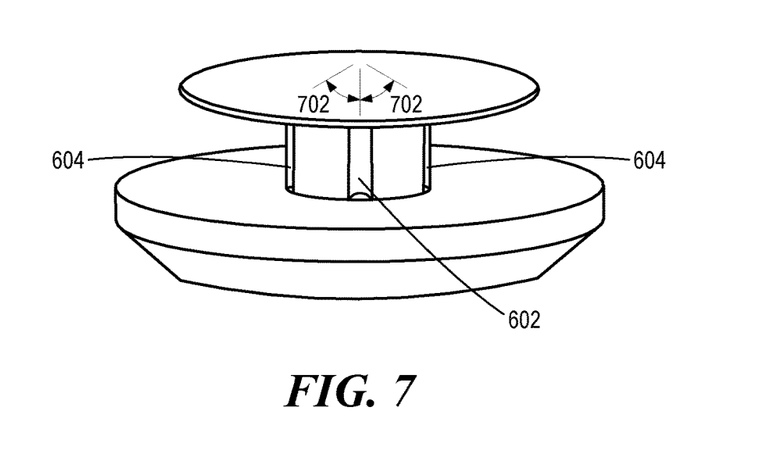
FIG. 7 is top perspective view of the boundary layer flow sensor of FIG. 6 according to one embodiment presented herein.

According to one embodiment, the boundary layer flow sensor 102 includes a total pressure tube 602 and two static pressure tubes 604 positioned at offset angles 702 of approximately 60 degrees in both directions from the total pressure tube 602. While the example shown in FIG. 6 may include two static pressure tubes 604, the second static pressure tube 604 is not visible behind the total pressure tube 602 according to that view. To better visualize the configuration having a total pressure tube 602 and two static pressure tubes 604, FIG. 7 shows a top perspective view of the top portion of the boundary layer flow sensor 102 of FIG. 6. The boundary layer flow sensor 102 is rotated in the view shown in FIG. 7 so that the total pressure tube 602 is facing directly outward into the ambient airflow, which would be flowing into the page.

The boundary layer flow sensor 102 has two static pressure tubes 604 positioned at offset angles 702 from either side of the total pressure tube 602. The offset angles 702 may be approximately 60 degrees as measured from the position of the total pressure tube 602. According to other embodiments, the offset angles 702 may include angles within the range of 40-70 degrees from the position of the total pressure tube 602. It should be appreciated that the disclosure herein contemplates any offset angle 702 that provides for a static pressure measurement to be taken, without being limited to any particular offset angle value. The two static pressure tubes 604 feed into the same chamber (not shown) and allow for an average to be taken to improve accuracy of the static pressure measurement. By utilizing two static pressure tubes 604 to obtain an average, a small miss-alignment of the boundary layer flow sensor 102 with respect to the local flow direction resulting in an increase on pressure on one side will result in a decrease in pressure on the other side. Thus, the average provides a good measure of the static pressure even with a miss-alignment.

Figure 8:
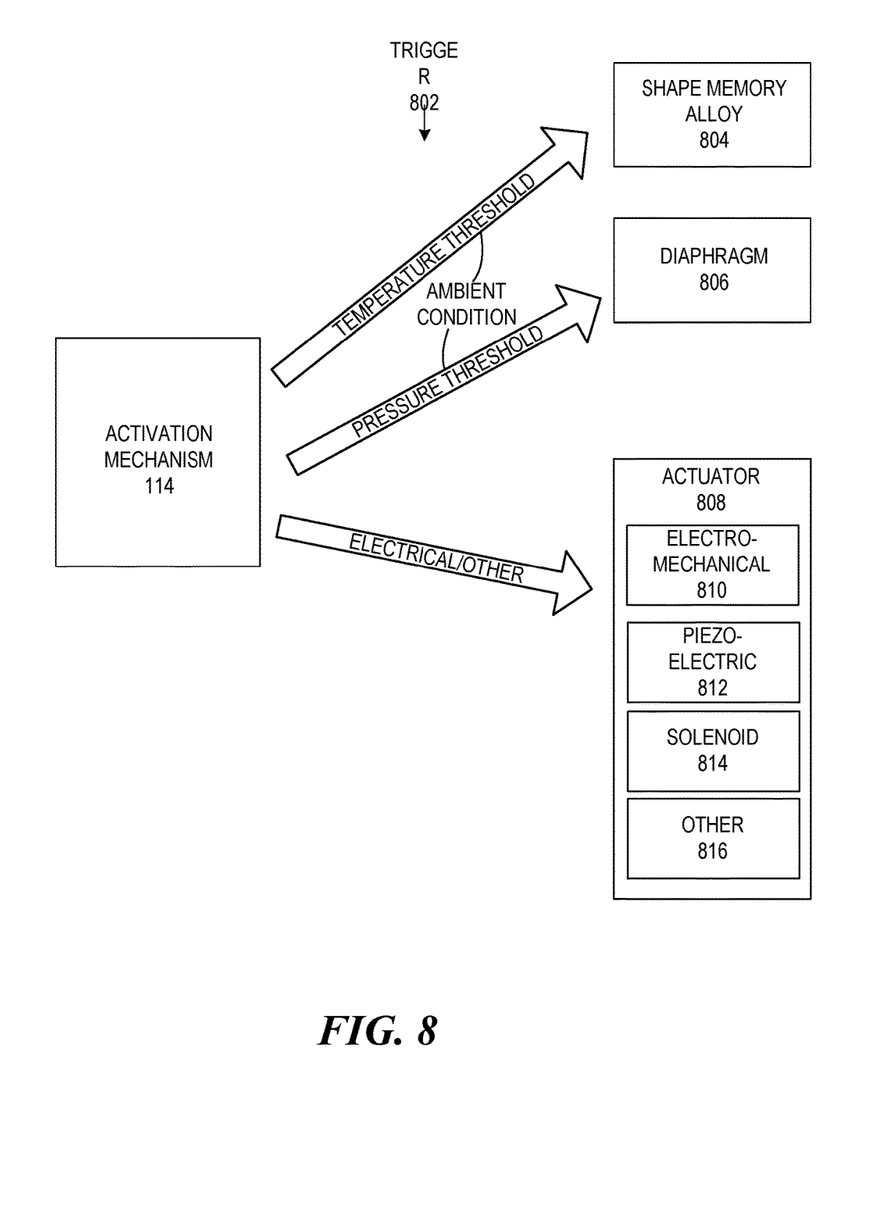
FIG. 8 is a block diagram illustrating various embodiments of an activation mechanism according to the disclosure provided herein.

FIG. 8 is a block diagram illustrating various embodiments of an activation mechanism 114 according to the disclosure provided above. As previously discussed, the activation mechanism 114 provides the transition between the closed state 112 and the open state 116 of the boundary layer flow sensor 102. Each of the embodiments described above with respect to FIGS. 1-7 may use one or more of various types of activation mechanisms 114. FIG. 8 shows various contemplated activation mechanisms 114 presented according to the type of trigger 802 to which the activation mechanism 114 is responsive to transition the boundary layer flow sensor 102 between the closed state 112 and the open state 116. The triggers 802 may be generally considered as being an ambient condition or an electrical or other type of selectable or preprogrammed switch.

An ambient condition may include a temperature threshold or a pressure threshold. An example of an activation mechanism 114 responsive to a temperature threshold is a shape memory alloy 804. Shape memory alloys 804 predictably change shape in response to being exposed to a particular temperature threshold. After transitioning back through that temperature threshold, the shape memory alloys 804 will return to their original shape. In the context of this disclosure, shape memory alloys 804 may be utilized in at least two ways. First, the deformable cover 218 described above with respect to FIG. 2 may be manufactured from a shape memory alloy 804 that is shaped to provide the closed state 112 at temperatures above a predetermined threshold, and in response to the ambient temperature dropping below the threshold temperature, the shape memory alloy 804 used in the deformable cover 218 will change shape to create the open state 116 shown and described above.

Another manner in which a shape memory alloy 804 may be used in the context of this disclosure is to be directly or indirectly attached to the moveable shaft 302. In response to the ambient temperature decreasing beyond a threshold temperature, the shape memory alloy 804 deforms to apply a force or pressure against the moveable shaft 302 to raise the shaft and create the pressure port 118 in the open state 116. An increase in temperature beyond the threshold temperature would return the shape memory alloy to its original shape, which would in turn lower the moveable shaft 302, closing the pressure port 118 and creating the closed state 112. This concept may also be applied to providing the movement of the hinged cover 118.

The activation mechanism 114 may also be responsive to a pressure threshold as a trigger 802 to open or close the boundary layer flow sensor 102. An example implementation includes utilization of a diaphragm 806 that expands and contracts in response to a decrease of ambient air pressure as altitude increases, and a corresponding increase of ambient air pressure as altitude decreases. The expansion and contraction of the diaphragm 806 may be used to physically push and pull the moveable shaft 302, as well as the hinged cover 118, to transition the pressure port 118 between the closed state 112 and the open state 116.

As mentioned above, in addition to an ambient condition, the trigger 802 for the activation mechanism 114 may include an electrical or other type of selectable or preprogrammed switch. As an example, a pilot or other crew member or engineer may press a physical or virtual button to selectively activate and deactivate the boundary layer flow sensor 102 to transition the sensor to the open state 116 and back to the closed state 112, respectively. Similarly, an aircraft system and associated controller may be programmed to activate and deactivate the boundary layer flow sensor 102 when a predetermined condition is satisfied. The predetermined condition may depend on the location of the particular boundary layer flow sensor 102 and on the timing and/or position associated with a desired laminar or turbulent airflow determination. As an example, the activation mechanism 114 may be programmed to create the open state 116 at a particular altitude, attitude, angle of attack, velocity, engine setting, flight control setting, stage of flight, or ambient condition such as temperature or pressure.

A trigger 802 that is electrical or other may include a number of types of actuators 808. Examples include, but are not limited to, electro-mechanical actuators 810, piezo-electric actuators 812, solenoids 814, and any others 816. It should be understood that while multiple activation mechanisms 114 having a trigger 802 that is electrical, any other type of trigger 802 may also be used without departing from the scope of this disclosure. Examples of other types of selectable or preprogrammed triggers and corresponding actuators 808 may include, but are not limited to, hydraulic, pneumatic, and magnetic.

Figure 9:
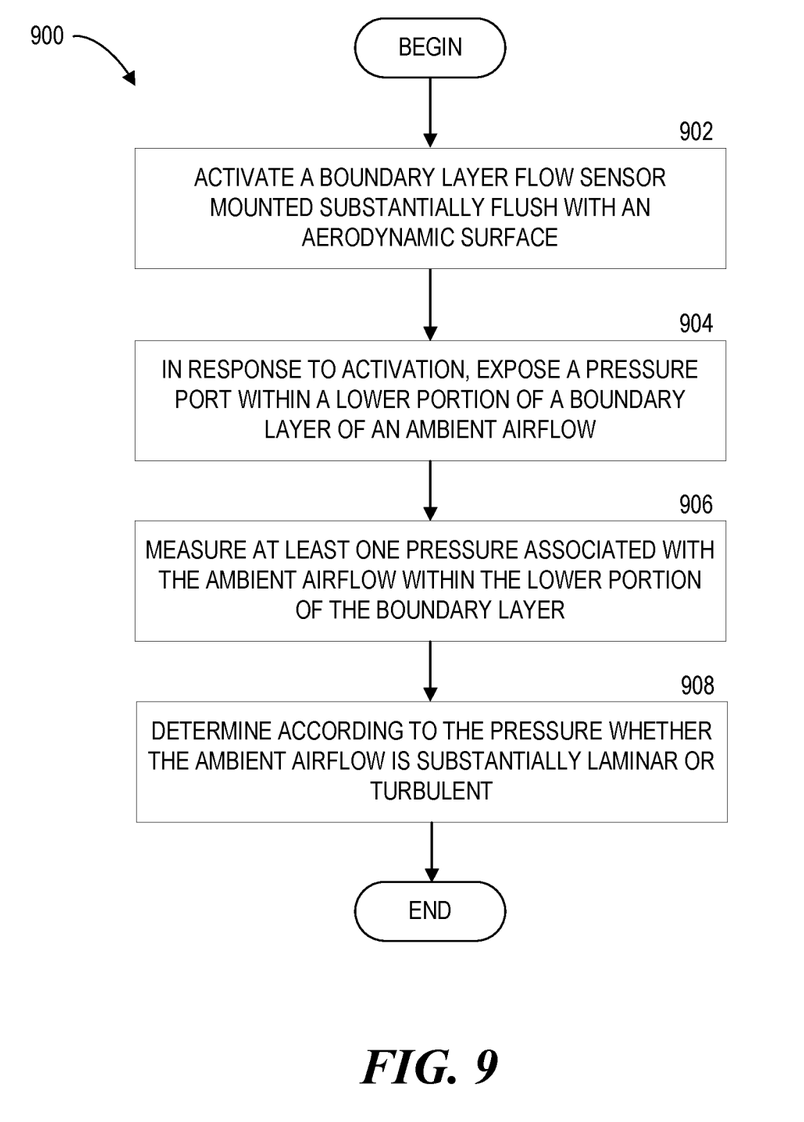
FIG. 9 is a flow diagram illustrating a method for determining flow characteristics of an ambient airflow over an aerodynamic surface.

Turning now to FIG. 9, an illustrative routine 900 for determining the flow characteristics of an ambient airflow over an aerodynamic surface 104 will now be described in detail. It should be appreciated that more or fewer operations may be performed than shown in FIG. 9 and described herein. Moreover, these operations may also be performed in a different order than those described herein. The routine 900 begins at operation 902, where a boundary layer flow sensor 102 that is mounted substantially flush with the aerodynamic surface 104 is activated. As described in detail above with respect to FIGS. 8, the activation mechanism 114 for activating the boundary layer flow sensor 102 may be triggered in various ways, including in response to ambient conditions or in response to an electrical or other selectable or preprogrammed switch.

From operation 902, the routine 900 continues to operation 904, where in response to activating the boundary layer flow sensor 102, the activation mechanism 114 exposes the pressure port 118 within the lower portion of the boundary layer of the ambient airflow. This operation represents the transition from the closed state 112 to the open state 116, which may include the opening of the moveable cover 108 or the raising of the moveable shaft 302. The routine 900 continues from operation 904 to operation 906, where a pressure measurement is taken within the lower portion of the boundary layer. This pressure measurement is taken with the pressure tube 110, including at least a total pressure tube 602, and according to one embodiment, two static pressure tubes 604 positioned at offset angles 702 of approximately 60 degrees in both directions from the total pressure tube 602. At operation 908, a determination is made from the pressure measurement whether the ambient airflow is substantially laminar or turbulent, and the routine 900 ends.

Figure 10:
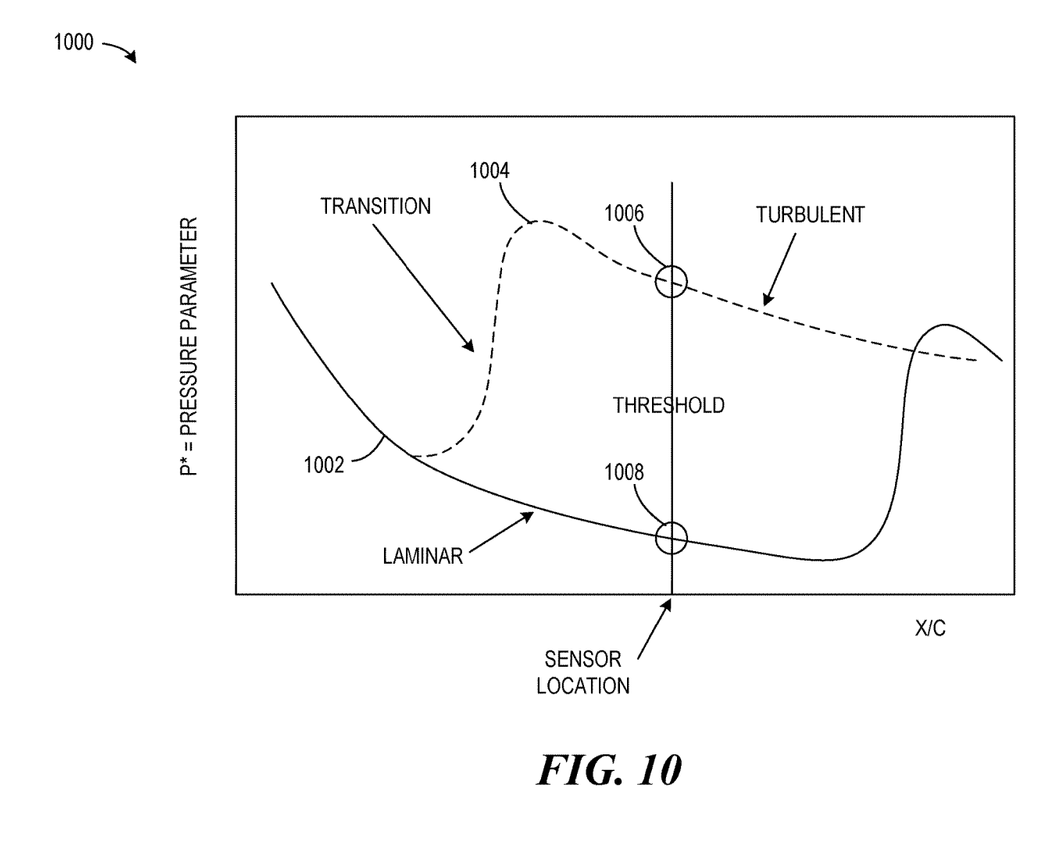
FIG. 10 is a graph illustrating a pressure parameter versus distance along a chord for both laminar and turbulent flows according to one embodiment presented herein.

The determination of whether the airflow is laminar or turbulent is based on the characteristics of the lower portion of the boundary layer of the ambient airflow where the pressure port 118 is exposed. FIG. 10 shows a graph 1000 illustrating a pressure parameter, p*, versus distance along a chord, x/c, for both laminar and turbulent flows. The distance along the chord, x/c, represents locations along the aerodynamic surface 104 from a position upstream of the boundary layer flow sensor 102 to a position downstream of the boundary layer flow sensor 102. The position of the boundary layer flow sensor 102, represented by the vertical line labeled "sensor location," may be any position of interest in which a determination of laminar or turbulent flow is desired.

The pressure parameter, p*, represents a variable that correlates to the difference between total pressure and static pressure, normalized by a free-stream reference dynamic pressure. According to this example, $$p^* = (P_t - P_s)/q, \text{ with } q = (\tfrac{1}{2}\rho U_{inf}^2),$$

$\rho$=[ambient air density], and $U_{inf}$=[free air velocity]

Looking at the graph 1000, the solid line representing the laminar plot 1002 corresponds to the plot of the pressure parameter of a laminar airflow within the lower portion of a boundary layer from a position x/c upstream of the boundary layer flow sensor 102 to a position x/c downstream of the boundary layer flow sensor 102. Similarly, the broken line representing the turbulent plot 1004 corresponds to the plot of the pressure parameter of a turbulent airflow within the lower portion of the boundary layer from a position x/c upstream of the boundary layer flow sensor 102 to a position x/c downstream of the boundary layer flow sensor 102. As mentioned above, the velocity gradient at the surface for a turbulent flow is higher than that of a corresponding laminar flow. Correspondingly, the pressure parameter, p*, is higher for turbulent flow as compared to laminar flow. The transition from laminar flow to turbulent flow is identified on the graph 1000 with a "transition" label and arrow pointing to the steep increase in the turbulent plot 1004 upstream of the boundary layer flow sensor 102. At the position of the boundary layer flow sensor 102, represented by the vertical line and label, the pressure parameter associated with a turbulent flow is identified with a turbulent pressure parameter 1006, while the pressure parameter associated with a laminar flow is identified with a laminar pressure parameter 1008.

When a determination of the flow characteristics, laminar versus turbulent flow, of an ambient airflow over an aerodynamic surface is desired, the boundary layer flow sensor 102 is activated to take one or more pressure measurements within the lower portion of the boundary layer of the airflow at the desired location. When the boundary layer flow sensor 102 includes both a total pressure tube 602 and static pressure tubes 604, measurements of total pressure, $P_t$, and of static pressure, $P_s$, may be taken and used to determine the corresponding pressure parameter, p*. If the boundary layer flow sensor 102 does not utilize a static pressure tube 604, then the static pressure may be estimated using a priori information.

To utilize the total pressure and static pressure to determine the state, or characteristics, of the ambient airflow, several estimates and determinations may be made to arrive at the various components of the graph 1000, and ultimately to the pressure parameter, p*. Having the pressure parameter then allows for the determination as to whether that pressure parameter falls on or above the turbulent plot 1004 to indicate turbulent flow, on or below the laminar plot 1002 to indicate laminar flow, or within the transition area between the laminar plot 1002 and the turbulent plot 1004 to indicate a boundary layer that is transitioning between laminar and turbulent flows.

First the boundary layer edge velocity is estimated utilizing a coefficient of pressure that is determined from computational fluid dynamics or measured by the boundary layer flow sensor 102. The precise algorithms for these estimates will not be provided as they are determined using computational fluid dynamics or other known techniques. Next, the velocity at the boundary layer flow sensor 102 is estimated for laminar and turbulent flows according to the position and height of the sensor. The sizing and positioning of the sensor will be described in greater detail below. Using the estimated velocities for laminar and turbulent flows at the position of the boundary layer flow sensor 102, the estimated values of the pressure parameter, p*, may be determined for both laminar and turbulent flows. After taking measurements with the boundary layer flow sensor 102 to determine total pressure and static pressure (or estimating static pressure) the pressure parameter for that measurement may be determined as discussed above, and compared with the estimated values of the pressure parameter per the graph 1000 to determine whether to flow is laminar, turbulent, or transitional. It should be appreciated that the estimated pressure parameter values for laminar and turbulent flow may be determined using actual flight test or wind tunnel test results. In other words, measurements may be taken and pressure parameters determined according to known laminar flow conditions, and then again after intentionally transitioning the boundary layer to turbulent flow conditions.

According to the various embodiments described herein, the boundary layer flow sensor 102 exposes the pressure port 118 to the lower portion of the boundary layer of the ambient airflow. Because turbulent flow has a substantially higher velocity gradient than laminar flow at the bottom of the boundary layer, the boundary layer flow sensor 102 is sized to expose the pressure port 118 to this lower portion of the boundary layer when configured in the open state 116. In order to determine the state or characteristics of the boundary layer ambient airflow using a single position measurement of by the boundary layer flow sensor 102, a priori information is used to estimate the laminar boundary layer thickness at the location of the boundary layer flow sensor 102 in order to size the sensor accordingly. Computational fluid dynamics or other known techniques may be used to calculate the laminar displacement thickness of the boundary layer at the position of interest where the boundary layer flow sensor 102 is to be positioned.

The height of the boundary layer flow sensor 102, and specifically of the pressure port 118, may then be determined based on the lowest expected displacement thickness of the laminar boundary layer at the position of the sensor. The height of the pressure port 118 may then be sized to be less than the lowest expected displacement thickness. According to one example, the height is sized at 75% of the lowest expected displacement thickness of the laminar boundary layer at the position of the boundary layer flow sensor 102. The height of the pressure port may be considered the distance from the aerodynamic surface 104 to the underside of the lid 502, or from the aerodynamic surface 104 to the top of the opening hole of the pressure port 118 if there is no lid 502 on the boundary layer flow sensor 102.

It should be clear from the disclosure above that the technologies described herein provide for a boundary layer flow sensor 102 that is capable of providing a single point measurement of pressure within a lower portion of a boundary layer to accurately determine whether the corresponding airflow is laminar or turbulent. According to the various embodiments, the boundary layer flow sensor 102 provides an open state 112 and a closed state 116 that allows for selective activation of the boundary layer flow sensor 102 for pressure measurements, while protecting the boundary layer flow sensor 102 from contamination when not in use.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A boundary layer flow sensor, comprising:
a body configured for mounting below an aerodynamic surface and having a pressure tube extending along a longitudinal axis of the body;
a pressure port configurable between an open state and a closed state, the pressure tube fluidly coupled to a lower portion of a boundary layer of an ambient airflow over the aerodynamic surface when the pressure port is in the open state, and the pressure tube fluidly decoupled from the boundary layer when the pressure port is in the closed state; and
an activation mechanism operative to fluidly couple and decouple the pressure tube to the boundary layer to provide the pressure port in the open state and closed state, respectively.

2. The boundary layer flow sensor of claim 1, wherein the activation mechanism comprises a movable cover separating the pressure tube from the ambient airflow, the movable cover movable between a lowered position in which the pressure port is in the closed state and a raised position in which the pressure port is in the open state.

3. The boundary layer flow sensor of claim 2, wherein the movable cover comprises a hinged cover configured to pivot along a downstream edge.

4. The boundary layer flow sensor of claim 2, wherein the movable cover comprises a deformable cover operative to change shape to reconfigure the pressure port between the open state and the closed state.

5. The boundary layer flow sensor of claim 4, wherein the deformable cover comprises a shape memory alloy configured to change shape in response to a threshold temperature.

6. The boundary layer flow sensor of claim 4, wherein the deformable cover comprises a material having an internal bias configured to switch between the open state and the closed state.

7. The boundary layer flow sensor of claim 1, further comprising a moveable shaft positioned within the body and comprising the pressure tube, and wherein the activation mechanism is responsive to an ambient condition to raise the movable shaft to configure the pressure port in the open state and to lower the movable shaft to configure the pressure port in the closed state.

8. The boundary layer flow sensor of claim 7, wherein the activation mechanism comprises a shape memory alloy, and wherein the ambient condition comprises a temperature threshold.

9. The boundary layer flow sensor of claim 7, wherein the activation mechanism comprises a diaphragm, and wherein the ambient condition comprises a pressure threshold.

10. The boundary layer flow sensor of claim 7, wherein the activation mechanism comprises a piezo-electric actuator or a solenoid.

11. The boundary layer flow sensor of claim 7, further comprising a lid attached to the movable shaft such that when the movable shaft is lowered, the lid is substantially flush with the aerodynamic surface.

12. The boundary layer flow sensor of claim 7, further comprising a lid attached to the movable shaft such that when the movable shaft is lowered, the lid protrudes above the aerodynamic surface, wherein the lid comprises a thickness that allows for laminar airflow over the lid and the aerodynamic surface.

13. The boundary layer flow sensor of claim 7, wherein the body comprises a fastener and wherein the moveable shaft is sized according to the fastener.

14. The boundary layer flow sensor of claim 1, further comprising a pressure transducer fluidly coupled to the pressure tube and operative to produce an electrical signal corresponding to the total pressure associated with the ambient airflow within the lower portion of the boundary layer.

15. The boundary layer flow sensor of claim 1, wherein the pressure tube comprises a total pressure tube configured to measure a total pressure of the ambient airflow within the lower portion of the boundary layer, and wherein the boundary layer flow sensor further comprises at least one static pressure tube positioned along the longitudinal axis of the body such that when the pressure port is configured in the open state, the at least one static pressure tube is fluidly coupled to the lower portion of the boundary layer at an offset angle from the total pressure tube.

16. The boundary layer flow sensor of claim 15, the at least one static pressure tube comprises two static pressure tubes positioned at offset angles of approximately 60 degrees in both directions from the total pressure tube.

17. A boundary layer flow sensor, comprising:
- a body configured for mounting within a fastener aperture in an aerodynamic surface, the body comprising a movable shaft that is moveable between a raised position to create an open state for a pressure port and a lowered position substantially flush with the aerodynamic surface to create a closed state for the pressure port, the moveable shaft having
- a total pressure tube extending along a longitudinal axis of the movable shaft and substantially aligned with an ambient airflow when the pressure port is in the open state, and
- at least one static pressure tube positioned at an offset angle from the total pressure tube; and
  - an activation mechanism operative to raise the movable shaft and fluidly couple the total pressure tube and the at least one static pressure tube to a lower portion of a boundary layer of the ambient airflow, and to lower the movable shaft to the lowered position, in which the moveable shaft is substantially flush with the aerodynamic surface, and fluidly decouple the total pressure tube and the at least one static pressure tube from the lower portion of the boundary layer of the ambient airflow.

18. A method for determining flow characteristics of an ambient airflow over an aerodynamic surface, the method comprising:
- activating a boundary layer flow sensor mounted substantially flush with the aerodynamic surface;
- in response to activating the boundary layer flow sensor, exposing a pressure port to a lower portion of a boundary layer of the ambient airflow;
- measuring at least one pressure associated with the ambient airflow within the lower portion of the boundary layer; and
- determining according to the at least one pressure, whether the ambient airflow is substantially laminar or turbulent.

19. The method of claim 18, wherein exposing the pressure port to the lower portion of the boundary layer of the ambient airflow comprises moving a moveable cover attached to a top end of a body of the boundary layer flow sensor to fluidly couple a pressure tube within the body to the boundary layer of the ambient airflow.

20. The method of claim 18, wherein exposing the pressure port to the lower portion of the boundary layer of the ambient airflow comprises raising a moveable shaft with a pressure tube from below the aerodynamic surface to fluidly couple the pressure tube to the boundary layer of the ambient airflow.

* * * * *